June 19, 1951 P. G. SULZER 2,557,156
PULSE-ECHO SYSTEM FOR IONOSPHERIC MEASURING EQUIPMENT
Filed April 28, 1947 5 Sheets-Sheet 1

INVENTOR.
Peter G. Sulzer
BY
Harry M. Saragovitz
Attorney

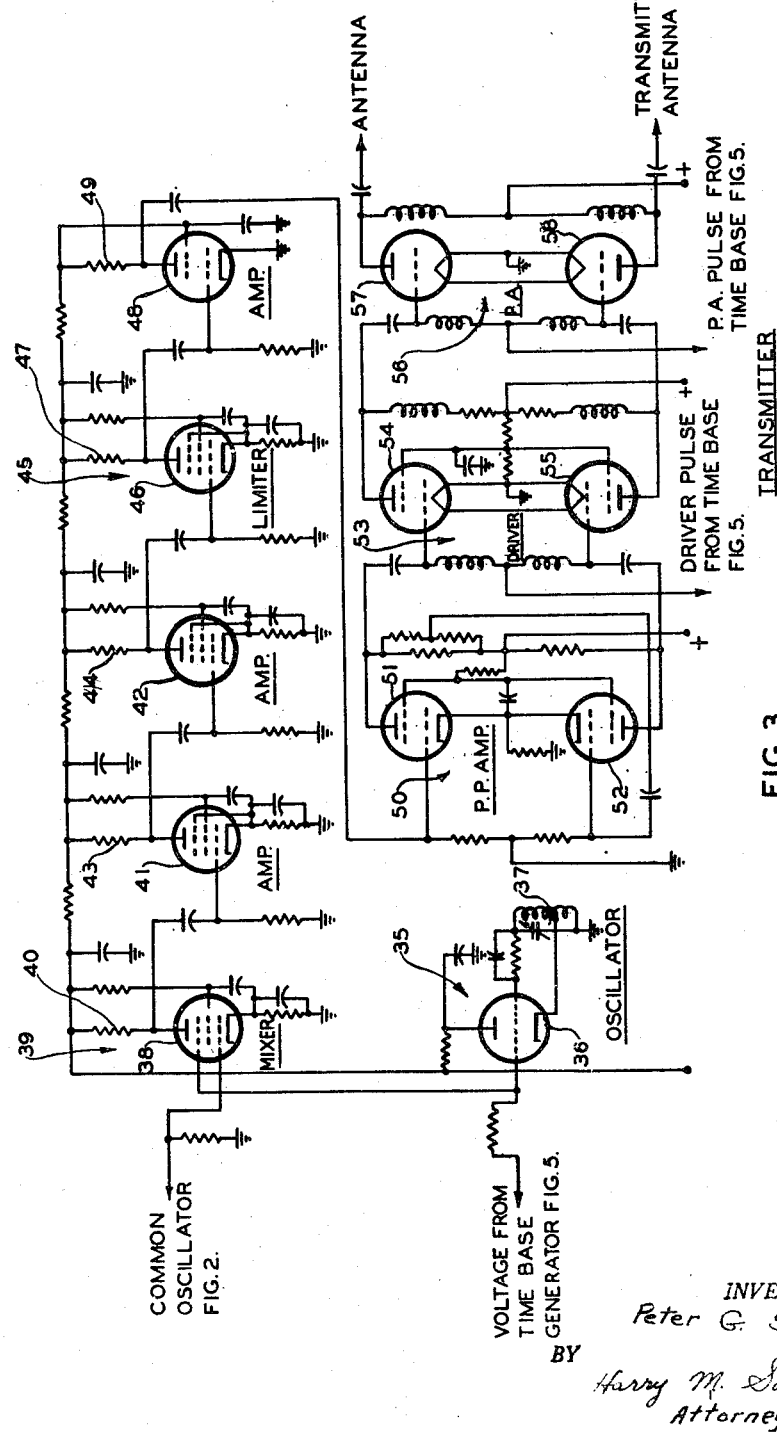

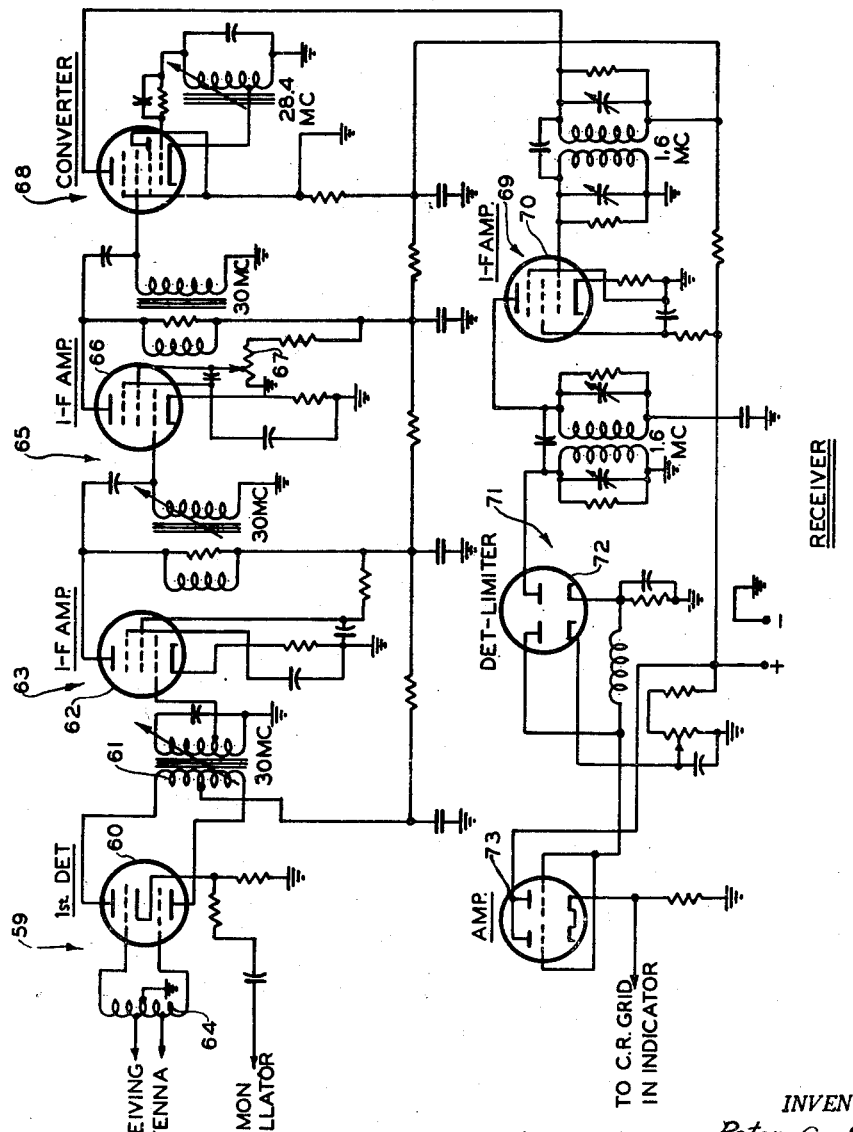

INVENTOR.
Peter G. Sulzer
BY Harry M. Saragovitz
Attorney

Patented June 19, 1951

2,557,156

UNITED STATES PATENT OFFICE 2,557,156

PULSE ECHO SYSTEM FOR IONOSPHERIC MEASURING EQUIPMENT

Peter G. Sulzer, State College, Pa.

Application April 28, 1947, Serial No. 744,414

3 Claims. (Cl. 343—13)

(Granted under the act of March 3, 1883, as amended April 30, 1928; 370 O. G. 757)

The present invention relates generally to measuring apparatus adapted for ionospheric investigation, and is more particularly directed to a multifrequency system for ionospheric measurement operating on the pulse-echo principle.

In the pulse-echo method for determining the vertical height of the reflecting layers of the ionosphere, wave trains of short duration are transmitted, reflected by the ionosphere and then received. The method is comparable to that employed in radar ranging, the ionosphere in this case serving as the reflecting object. The transmitted pulses are of longer duration, however, lasting in the order of $10^{-4}$ seconds, and the distances (and elapsed times) involved are greater.

Multifrequency pulse-echo apparatus for ionospheric investigation has heretofore been developed wherein the frequency of the transmitted pulses is continuously swept within a predetermined range, the frequency sweep being effected in a short period, such as one minute, so that the ionosphere will not perceptibly change during the sweep period. In indicating such multifrequency records on an oscilloscope coupled to the output of a pulse-echo receiver, the vertical deflection is obtained from a timing wave synchronized with the transmitted pulses, whereby the deflections along the vertical base on the oscilloscope screen are an index of virtual height. The voltage controlling horizontal deflection is varied in accordance with the transmitter frequency so that the distance along the horizontal base on the oscilloscope screen represents the transmitted frequency.

The primary advantage residing in multifrequency ionosphere records of the above described type is that it makes possible the evaluation of the critical frequencies of the various ionosphere layers. These critical frequencies are indicated either by a sudden jump in the virtual height corresponding to refraction that shifts from one layer to a higher layer, or by a crinkle in the curve. The large virtual height associated with these crinkles arises from the very low group velocity of a wave train traveling in an ionized medium when the frequency is close to the critical frequency. Multifrequency records greatly facilitate the separation of ordinary and extraordinary rays, and, in addition, they make it possible to distinguish reflections produced by a higher layer from multiple reflections.

In one form of multifrequency apparatus developed by the Bureau of Standards (Gilliland, T. R., "Field Equipment for Ionospheric Measurements," Journal of Research, National Bureau of Standards, May 1941), a pulsed transmitter is linked to a receiver by a beat frequency system. The output of a variable frequency oscillator is mixed with the output of an oscillator operating at the intermediate frequency of the receiver. The difference of these two frequencies is selected and amplified in the transmitter. Signals to be received are mixed with the output of the variable oscillator, the frequency difference then being mixed with the intermediate frequency which is amplified and detected in the usual manner. In this Bureau of Standards instrument the variable oscillator, converter and power amplifier are tracked by means of cams. This system appears to have the usual disadvantages that are connected with mechanical tuning arrangements. One desirable characteristic of this system, however, is the heterodyne scheme which insures that a receiver and transmitter are always operating on the same frequency.

Another system currently employed is that in the Type 249 equipment of National Physical Laboratory (British) design, which uses the frequency-modulation method of developing pulses. ("Technical Description and Operating Instructions for Radio Equipment Type 249," Baddow Research Laboratories, West Hanningfield Road, Great Baddow, Chelmsford, Essex, England.) The transmitter is tuned rapidly by a motor-driven rotating capacitor through the frequency on which the receiver is operating; the receiver is therefore subjected to a pulse whose shape and duration depend on the band-width of the receiver and the rate of change of transmitter frequency. The portion of the energy in the pass band of the receiver which is radiated and returned to the installation by the ionosphere will be recorded as a pulse. The frequency-modulation method as employed in this equipment is inefficient as compared to pulse methods since the transmitter is operating continuously and only a portion of the total received energy is utilized by the receiver. Another disadvantage of the system is the fact that the effective pulse width will in general not be constant, unless the rate of change of the transmitter frequency is maintained at a uniform level over the frequency range, which is usually not the case. As a result the height resolution of the equipment varies over the frequency band employed. To produce narrow pulses, the transmitter frequency must be varied rapidly across the receiver frequency range by a high speed motor-driven inductor or capacitor.

It is a principal object of the present invention to provide an improved multifrequency pulse-echo apparatus for the investigation of the ionosphere. More specifically, it is an object of this invention to provide apparatus of this type wherein the mechanical disadvantages of prior art systems are obviated, the apparatus functioning without the use of cams and other complex mechanical tuning devices.

Briefly stated, the present invention employs a heterodyne method similar to that used in the above described Bureau of Standards equipment in that a pulse-echo receiver and transmitter are linked by a beat frequency arrangement. However, complicated tuning arrangements are avoided by the use of untuned receiver and transmitter circuits.

For a better understanding of the invention as well as other objects and further features thereof reference is had to the following detailed description to be read in connection with the accompanying drawing wherein, Fig. 1 is a system block diagram of a preferred embodiment of the invention;

Fig. 3 is a schematic diagram of the transmitter of the system;

Fig. 4 is a schematic diagram of the receiver of the system;

To facilitate explanation, the system will be described as it functions to investigate the character of the ionosphere at all frequencies between one and twenty megacycles. However, it is to be understood that the specified frequency range is by way of illustration only, the invention being operable in any desired frequency range.

Figure 1:
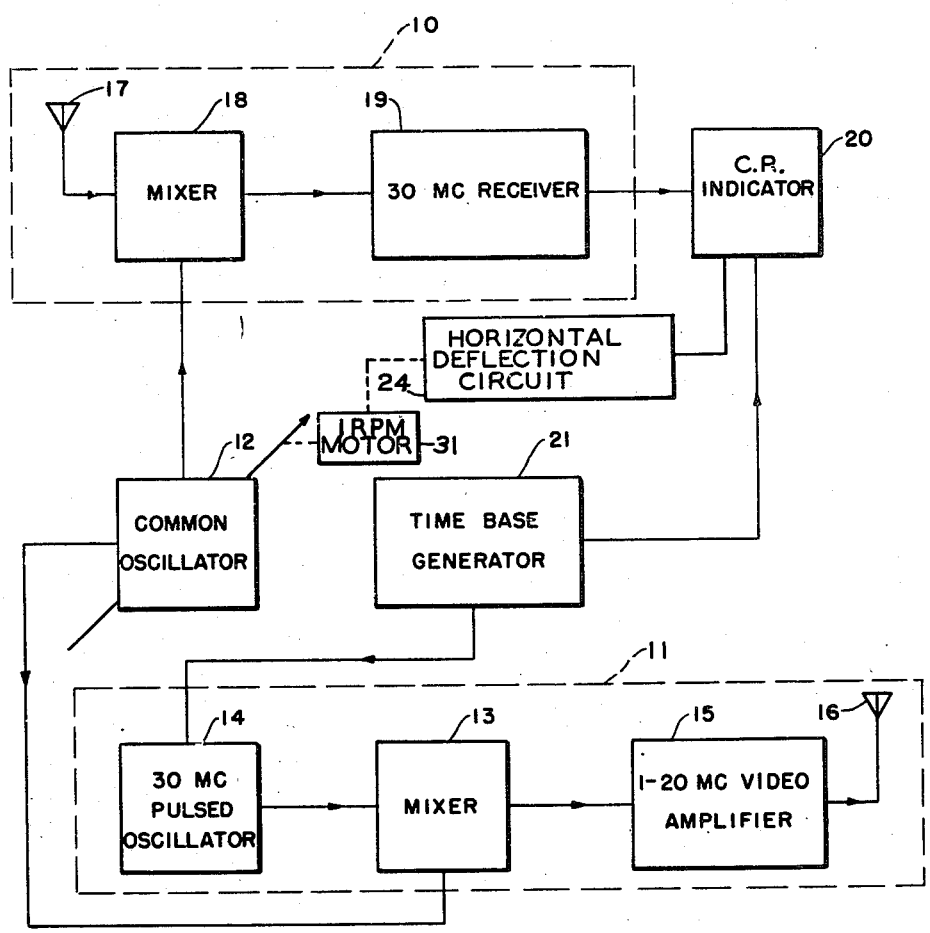

Referring now to the block diagram in Fig. 1 the system includes a receiving channel 10, a transmitting channel 11, and a common oscillator 12 for controlling both said transmitting and receiving channels. Common oscillator 12 is tuned from thirty-one to fifty megacycles. In transmitting channel 11, the output of common oscillator 12 is heterodyned in a mixer 13 with the output of a thirty megacycle pulsed oscillator 14.

The difference frequency in the output of mixer 13, which varies from one to twenty megacycles, excites an untuned, wide band, video amplifier 15 which feeds the transmitting antenna 16. Transmitting antenna 16 is oriented to project pulses in the direction of the ionosphere. In the receiving channel, reflected echo-pulses from the ionosphere are intercepted by a receiving antenna 17. The echo-pulses vary from one to twenty megacycles and are heterodyned in a mixer 18 with the thirty-one to fifty megacycles frequencies yielded in the output of common oscillator 12. The difference frequency, which is constant at thirty megacycles, is amplified and detected by a superheterodyne receiver 19, the output of receiver 19 being applied to an oscilloscope indicator 20 whose pattern exhibits ionosphere height plotted as to function of frequency. Since the instantaneous operating frequencies of transmitting channel 11 and receiving channel 10 are governed by the same oscillator, that is common oscillator 12, they are concurrently maintained on the same frequency. A time base generator 21 provides a synchronizing voltage to operate pulsed oscillator 14, and a time base deflection voltage for indicator 20.

The system illustrated in Fig. 1 has no serious mechanical limitations in that it does not entail a large plurality of variable capacitors rotating at high speed, and does not require cam arrangements as in prior art devices. The frequency range may be covered as rapidly as desired since it is necessary to rotate only a simple tuning element in common oscillator 12 to tune both the transmitter and receiver from one to twenty megacycles. It is relatively easy to secure high output power by this method since variable capacitors or variometers are not used in the transmitter output circuits. The apparatus of the system consists of five basic units; the common oscillator, transmitter, receiver, time base generator, and indicator, these units being illustrated in Figs. 2 to 6, respectively.

Figure 2:
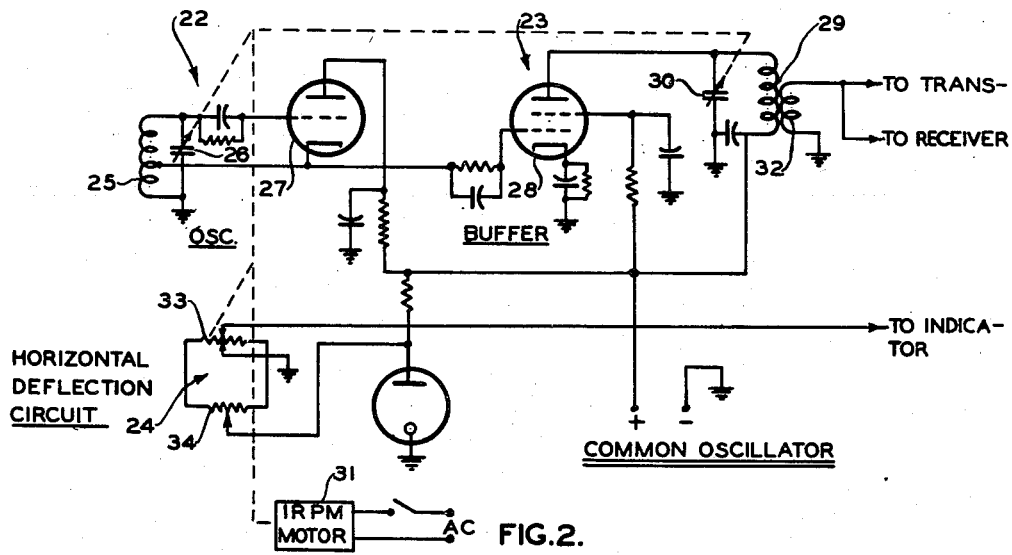
Fig. 2 is a schematic diagram of the common oscillator of the system.

Referring now to Fig. 2 the common oscillator of the system comprises a conventional Hartley oscillator circuit 22, a buffer amplifier 23, and a horizontal deflection voltage circuit 24. Buffer 23 serves to isolate Hartley oscillator 22 from the transmitting and receiver circuits. Hartley oscillator 22, which is tunable between 31 and 50 megacycles, includes a parallel resonant circuit having a tapped inductor 25 and a variable capacitor 26, and a triode tube 27. Buffer amplifier 23 includes a screen grid tube 28, and a tunable output circuit having an inductor 29 and a variable capacitor 30 thereacross.

Voltage derived from cathode of oscillator triode 27 is applied to the control grid of screen grid tube 28 to drive the buffer stage. Oscillator capacitor 26 and buffer capacitor 30 are ganged and driven by an electric motor 31, preferably rotating at one R. P. M. Capacitors 26 and 30 are of the type having semi-circular rotor plates so that the complete frequency range is covered in 180° rotation of the capacitor shafts in a 30 second period. Link coupling 32 is used between the buffer tank circuit and the transmission lines to the transmitter and the receiver.

Motor 31 also serves to drive a centertapped potentiometer 33 in the horizontal deflection circuit 24, said potentiometer being connected so as to develop a positive voltage. The voltage is zero when oscillator 22 is operating on 31 megacycles, and rises to a maximum value at 50 megacycles. This voltage is applied to the horizontal deflection circuits in the indicator, the deflection then depending on the operating frequency of the equipment. Since the tuning capacitors 26 and 30 are always rotating in the same direction, the common oscillator will pass through a given frequency once when the capacitor plates are meshing and once when they are unmeshing. It is necessary that the horizontal deflection voltage applied to the indicator be the same for these two positions. A "trace overlap" control potentiometer 34 is provided in parallel connection with potentiometer 33 to correct for errors in the location of the centertap on potentiometer 33.

With this arrangement, there is a limitation in the speed in covering the frequency range, that is, the speed with which the capacitors 22 and 23 can be rotated. If the operating frequency is changed too rapidly, it is found that by the time the echoes return to the receiver, the common oscillator is tuned to another frequency and the echo signals are received on the slope of the selectivity curve of the intermediate frequency stage in the receiver, thereby resulting in a loss of sensitivity and distortion of the received pulses. If the frequency range from 1 to 30 megacycles is traversed in 30 seconds, echoes from a height of 1,000 kilometers will be detuned 4.2 kilocycles. However, this amount of detuning is not considered to be serious and the use of the 1 R. P. M. motor 31 appears to be satisfactory.

Referring now to Fig. 3, the transmitter begins with a pulsed oscillator 35, operating at 30 megacycles, said oscillator including a triode tube 36 and a resonator 37 in a Hartley circuit arrangement. The time base generator of Fig. 5 supplies a fixed cutoff bias to the grid of oscillator triode 36, this fixed bias being removed during the pulses when the tube operates. Pulsed oscillator 35 drives the suppressor grid of a pentode 38, arranged in a mixer circuit 39, the control grid of pentode 38 being driven by the common oscillator output of Fig. 2. Mixer 39 is of the plate-detector type and operates with a low impedance load 40, said load providing uniform gain over the band of frequencies covered by the equipment. The most important frequency appearing across load 40 is the difference frequency which varies from 1 to 20 megacycles. Any sum or higher-order frequencies appearing across load 40 are of negligible importance since they are considerably attenuated in the mixer. Following mixer 39 are two stages of amplification employing pentodes 41 and 42, each having a low impedance output load 43 and 44, respectively. The voltage developed across load 44 is applied to a limiter stage 45 including a pentode 46. Pentode 46 is slightly overdriven the result of which is a limiting action that aids in maintaining constant output across a low impedance load 47.

Pentode 46 in limiter stage 45 drives a single amplifier including a screen grid tube 48 operating at zero bias and high plate current to develop a voltage across a low impedance load 49 sufficient to excite a push-pull amplifier 50, said push-pull amplifier including a pair of screen grid tubes 51 and 52. Push-pull amplifier 50 is in effect a phase inverter the grid of tube 52 being driven by the plate of tube 51. Push-pull amplifier 50 develops sufficient voltage to excite a driver push-pull stage 53 which operates as a pulsed Class A amplifier. Normally the time base generally supplies sufficient bias for plate current cutoff of driver amplifier 53 when the transmitter is pulsed. The driver amplifier 53 serves to excite the final amplifier 56, said final amplifier including triodes 57 and 58 arranged in a push-pull circuit. The output of final amplifier 56 is fed to the transmitting antenna.

Referring now to Fig. 4, the receiver of the system is of a double-intermediate-frequency superheterodyne design. The first detector 59 includes a dual triode 60 arranged to operate as a balanced mixer. Voltage from the common oscillator in Fig. 2 is applied to the cathodes of tube 60 in parallel while the incoming signals from the receiving antenna are applied to the grids in push-pull. The plates of tube 60 are also connected in push-pull, with the plate coil 61 inductively coupled to the grid circuit of pentode 62 in a first amplifier 63.

To prevent interference as result of crossmodulation from stations operating in other frequency bands, a high pass filter is used in the input circuit of the first detector 59, and said high pass filter taking the form of a shunt coil 64 which also acts as a transformer to connect the receiving antenna to the grids of tube 60. The 30 megacycle I. F. amplifier consists of two stages, a first stage 63 and a second stage 65 employing a pentode 66. The gain of the receiver is controlled by varying the screen voltage of pentode 66 in the second I. F. stage by means of a potentiometer 67. Following I. F. stage 65 is a second converter stage 68 which changes the 30 megacycle intermediate frequency to 1.6 megacycles by mixing with a 28.4 megacycle signal. There is one I. F. amplifier 69 at 1.6 megacycles, amplifier 69 including a pentode 70. The output of I. F. amplifier 69 is fed to a detector-limiter stage 71 including a dual diode tube 72, one-half of said tube being arranged to act as a detector, the other half as a limiter. The output of detector-limiter 71 is applied through a cathode follower amplifier including triode 73 to the cathode ray grid of the indicator in Fig. 6.

Figure 5:
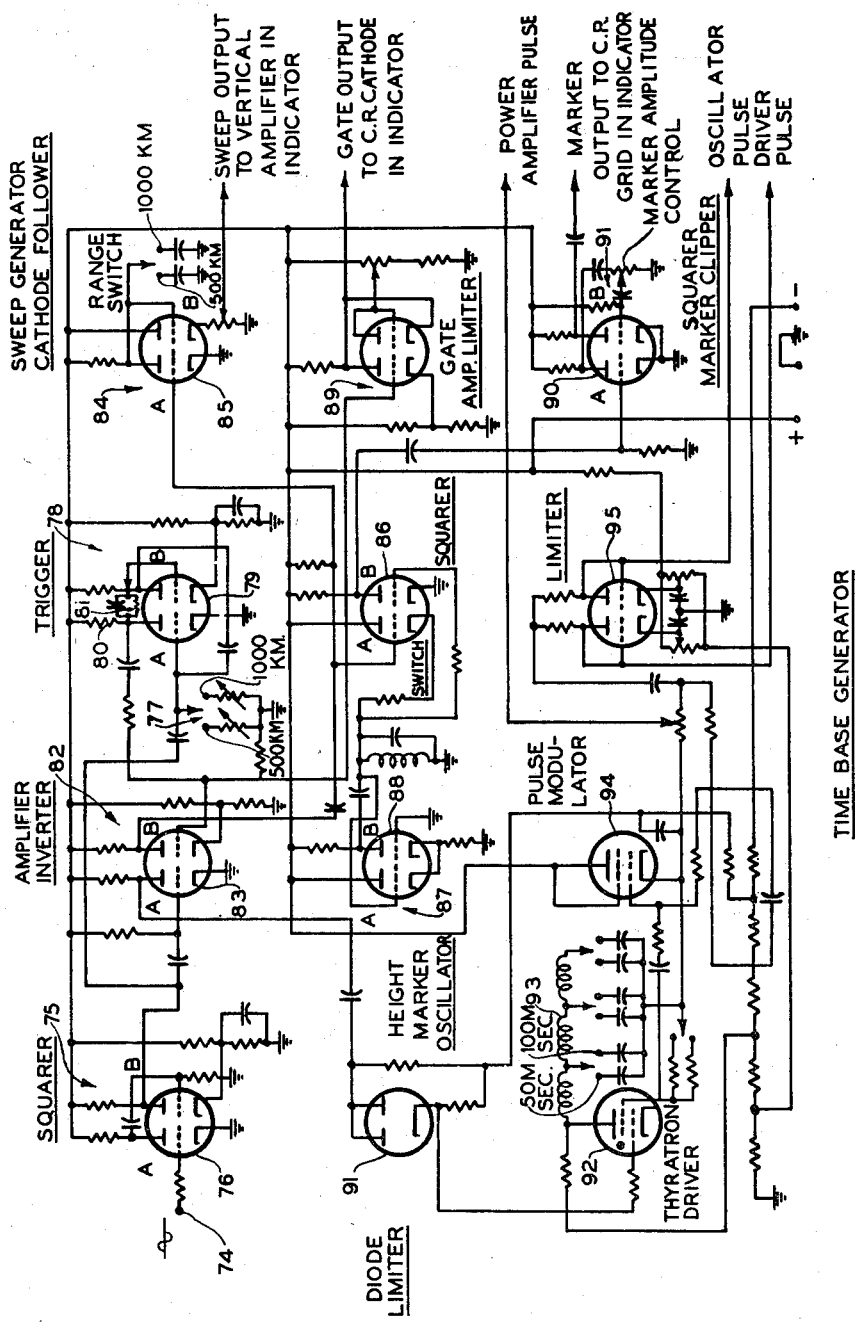
Fig. 5 is a schematic diagram of the time base generator of the system.

Referring now to Fig. 5, schematically illustrated is the time base generator, the functions of the time base being synchronized with a sinusoidal frequency applied at terminal 74. A squarer 75 is provided including a dual triode tube 76. Tube 76 operates as a distortion amplifier whose output is a square wave, the sinusoidal wave being applied thereto at the grid of tube 76A. The output of squarer 75 is differentiated by R-C network 77 and used to drive a conventional trigger circuit 78, including a dual triode tube 79.

The plate voltage of triode 79A developed across load resistor 80 is a positive pulse whose duration is controlled by R-C network 81. In the present embodiment, the duration of the pulse is 3300 or 6600 microseconds long depending on whether the range switch, R-C differentiating network 76, is set at 500 or 1,000 kilometers. This pulse drives an inverting amplifier 82 including a dual triode tube 83, amplifier 82 operating a sweep-generator 84 including a dual triode 85, and a height marker generator. The output of the sweep generator 84 is a saw-tooth wave which gives a linear sweep in the indicator.

The height marker generator contains a switching triode tube 86A, a negative resistance oscillator 87 including a dual triode tube 88, a squarer tube 86B, and a dual triode amplifier tube 89. The height marker oscillator 87 is of the negative resistance type with cathode coupling such as disclosed by Sziklai and Schroeder, "Cathode Coupled Side-Band Amplifier," I. R. E., volume 33, October 1945. Oscillator 87 is switched on by means of tube 86A operating as a cathode follower. The sine wave output from height marker oscillator 87 is squared by tubes 86B and 90A. The square wave is differentiated by R-C network 91 and applied to the grid of tube 90B, an amplifier whose output is a series of positive pulses one for each cycle from oscillator 87. These are applied to the grid of the cathode ray tube in the indicator, thereby producing horizontal lines at the proper intervals. The trigger tube 78A also drives a gate amplifier whose output is a negative pulse. This is applied to the cathode of a cathode ray tube increasing its intensity during the sweep.

The transmitter pulsing circuit uses the socalled "boot-strap" amplifier. The square wave output from the plate of squarer tube 76B is differentiated and used to drive the grid of tube 83A an amplifier with an output of positive pulses. These positive pulses are passed through a diode limiter 91 to the grid of a thyratron 92.

Thyratron 92 connects a charged artificial transmission line 93 across a load resistor. The discharge of the line is in the form of a positive rectangular pulse whose duration depends on the constants of the line. The pulse is applied between the control grid and the cathode of a modulation tube 94 which has its load resistance in the cathode circuit. The output of modulator tube 94 is a positive pulse which is used to pulse the power amplifier in the transmitter. The modulator might at first appear to be a cathode follower; there is, however, no degenerative action since cathode voltage is not subtracted from the driving voltage. Thyratron 92 with its associated circuit follows the cathode potential of the modulator, hence the name "boot-strap." There are two other pulse outputs obtained from a tap on the modulator load. The amplitudes of these pulses are controlled by the halves of diode tube 95 which are connected as diode limiters. One of these pulses operate the 30 megacycles oscillator in the transmitter while the other controls the driver stage therein.

When the cathode of a modulator tube 94 goes positive, the cathode and plate of thyratron 92 also go positive. If the grid of the thyratron is connected directly to the pulse circuits of tube 83A it would remain negative for a time, and would be bombarded by positive ions. The combination of the diode 95 and various decoupling resistors allows the grid to go positive also, preventing this bombardment.

Figure 6:
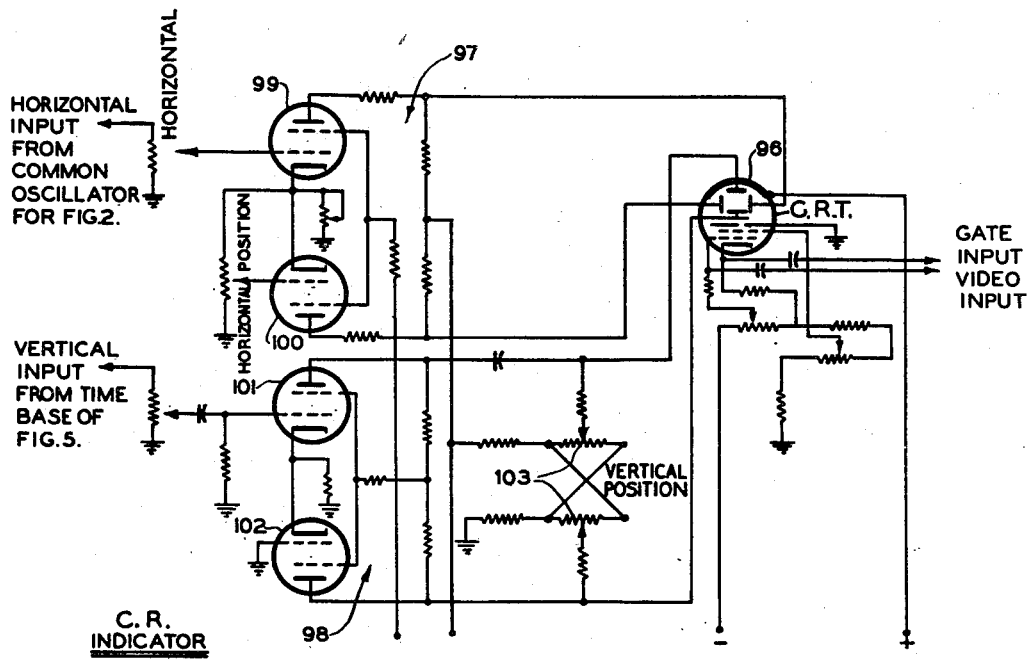
Fig. 6 is a schematic diagram of the indicator of the system.

Referring now to Fig. 6, the indicator includes a cathode ray tube 96, a balanced amplifier 97 connected to the horizontal deflection plates of said tube, and a balanced amplifier 98 connected to the vertical deflection plates of said tube. Video signals from the receiver output of Fig. 4 and height markers from the time base of Fig. 5 are applied to the grid of oscillator 96 with positive polarity thereby appearing as a bright line on a dark background.

Cathode ray tube 96 is gated by means of negative pulses from the time base in Fig. 5 applied to its cathode. Horizontal deflection amplifier 97, which is driven by the voltage developed in the horizontal deflection circuit 24 of Fig. 2, employs a pair of screen grid tubes 99 and 100 in a push-pull arrangement, these tubes being directly coupled to the horizontal deflection plates of oscillator 96. Horizontal positioning is obtained by varying a positive bias on the control grid of tube 100. Vertical deflection amplifier 98 includes a pair of pentodes 101 and 102 in a push-pull arrangement, the tubes being driven by the sweep output of the time base generator in Fig. 5. Vertical positioning is obtained in this case by the usual dual potentiometers 103.

Figure 7:
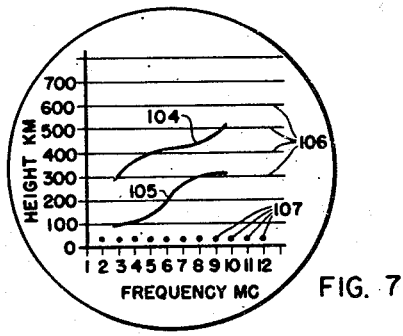
Fig. 7 is a typical pattern obtained on the indicator of the system.

Referring now to Fig. 7, a typical pattern obtained with the indicator of Fig. 6 is illustrated. The record obtained takes the form of a H-F curve such as curves 104 and 105, in which the vertical heights H are plotted as a function of frequency F. The H-F curve appears on the screen of cathode ray tube 96 in Fig. 6, said screen preferably having a long persistance characteristic. The vertical sweep line is moved along the face of the tube as the frequency changes, thereby giving a two-dimensional record. The height markers appear as horizontal lines 106, while the frequency markers appear as dots 107 arrayed along the bottom of the record.

While there has been described what at present is considered a preferred embodiment of the system, it will be obvious that many changes and modifications may be made therein without departing from the essential features of the invention. Accordingly, it is aimed in the accompanying claims to cover all such changes and modifications as fall within the true spirit and scope of the invention.

The invention described herein may be manufactured and used by or for the Government for governmental purposes, without the payment to me of any royalty thereon.

What is claimed is:

1. A multifrequency pulse-echo apparatus for ionospheric investigation comprising a receiving channel including a receiving antenna for ionospheric signals, a first mixer having a pair of input circuits, one input circuit of said first mixer being coupled to said receiving antenna, and a superheterodyne receiver connected to the output of said first mixer, said receiver having an untuned radio frequency input stage; a transmitting including a pulsed oscillator for generating radio frequency pulses at a constant frequency, a second mixer having a pair of input circuits, one input circuit of said mixer being connected to said pulsed oscillator, an untuned radio frequency amplifier connected to the output of said second mixer, and a transmitting antenna for radiating exploratory pulses connected to the output of said untuned amplifier; a common oscillator connected to the other input circuit of said first mixer and said second mixer, said common oscillator including a rotatable tuning element for automatically sweeping the frequency of said common oscillator within a predetermined range; means for continuously rotating said tuning element; means to initiate the generation of a time base voltage at the instant of each pulse transmission, means to generate a sweep base voltage in synchronism with the sweep of said common oscillator frequency, a cathode ray oscilloscope, means to control the horizontal deflection of the cathode ray beam of said oscilloscope with the output of said sweep base voltage generating means, means to control the vertical deflection of said cathode ray beam with the output from said time base voltage generating means, and means to control the intensity of said beam with the output of said superheterodyne receiver, whereby a pattern of ionosphere height as a function of transmitted frequency is exhibited on said oscilloscope.

2. A multifrequency pulse-echo apparatus for ionospheric investigation comprising a receiving channel including a receiving antenna for ionospheric signals, a first mixer having a pair of input circuits, one input circuit of said first mixer being coupled to said receiving antenna, and a superheterodyne receiver connected to the output of said first mixer for detecting the difference frequency in the output of said first mixer, said receiver having an untuned radio frequency input stage; a transmitting channel including a pulsed oscillator for generating radio frequency pulses at a constant frequency, a second mixer having a pair of input circuits, one input circuit of said mixer being connected to said pulsed oscillator, an untuned radio frequency amplifier connected to the output of said second mixer for amplifying the difference frequency in the output of said second mixer, and a transmitting antenna for radiating exploratory pulses connected to the output of said untuned amplifier; a common oscillator connected to the other input circuit of said first mixer and said second mixer, said common oscillator including a rotatable tuning element for sweeping the frequency of said common oscillator within a predetermined range; means for continuously rotating said tuning element; a cathode ray oscilloscope including vertical and horizontal deflection means and cathode ray beam intensity control means; means for generating a time base voltage at the instant of pulse transmission, means for applying said time base voltage to said vertical deflection means; means for generating a sweep voltage in synchronism with the frequency sweep of said common oscillator; means to apply said sweep voltage to said horizontal deflection means; and means for applying the output of said receiver to said intensity control means whereby a pattern of ionosphere height as a function of transmitted frequency is exhibited on said oscilloscope.

3. A multifrequency pulse-echo apparatus for ionospheric investigation comprising a receiving channel including a receiving antenna system for ionospheric signals, a receiver coupled to said antenna system; a transmission channel including a transmitting antenna system for radiating ionospheric signals, a pulse modulated radio frequency transmitter coupled to said transmitting antenna system, means for concurrently sweeping said receiver and transmitter through a predetermined frequency range, said receiving and transmitting antenna systems having a directivity which is substantially independent of frequency over said predetermined frequency range, means to generate a time base voltage at the instant of each pulse transmission, means to generate a sweep base voltage in synchronism with the sweep of said receiver and transmitter, a cathode ray oscilloscope, means to control the horizontal deflection of the cathode ray beam of said oscilloscope with the output of said sweep base voltage generating means, means to control the vertical deflection of said cathode ray beam with the output of said time base voltage generating means, and means to control the intensity of said beam with the output of said receiver, whereby a pattern of ionosphere height as a function of transmitted frequency is exhibited on said oscilloscope.

PETER G. SULZER.

REFERENCES CITED

The following references are of record in the file of this patent:

UNITED STATES PATENTS

| Number | Name | Date |
| --- | --- | --- |
| 2,317,547 | McRae | Apr. 27, 1943 |
| 2,402,606 | Davis | June 25, 1946 |
| 2,408,791 | Magnuski | Oct. 8, 1946 |
| 2,414,096 | Dimond | Jan. 14, 1947 |
| 2,426,189 | Espenschied | Aug. 26, 1947 |
| 2,433,804 | Wolff | Dec. 30, 1947 |